April 8, 1969  R. A. HONKONEN ET AL  3,437,282
ELECTRICALLY DRIVEN FISHING REEL
Filed Sept. 14, 1964
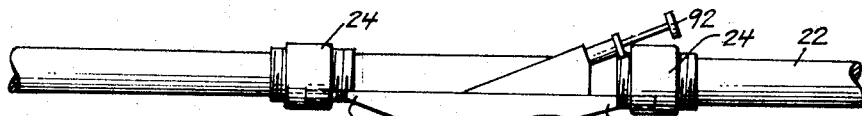
FIG. 1
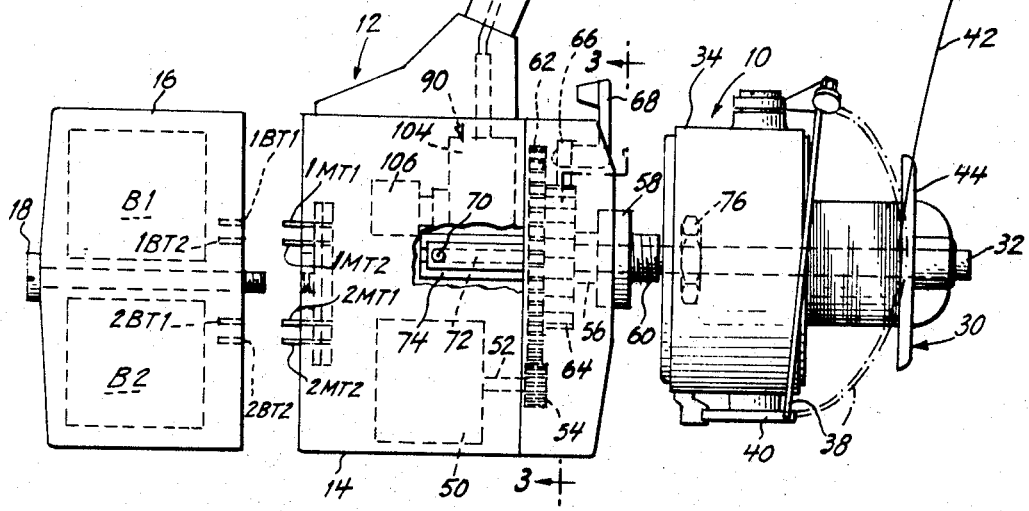
FIG. 3
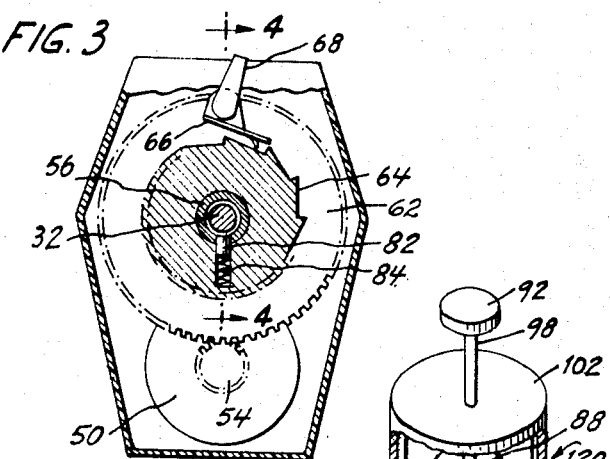
FIG. 4
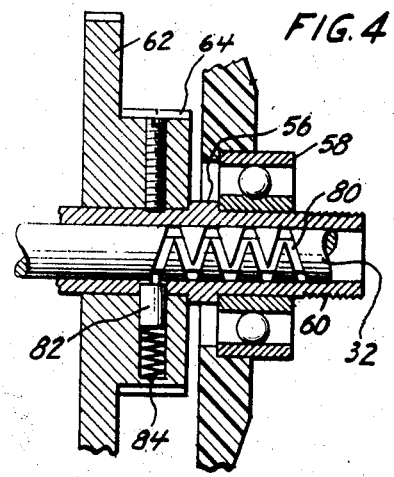
FIG. 6
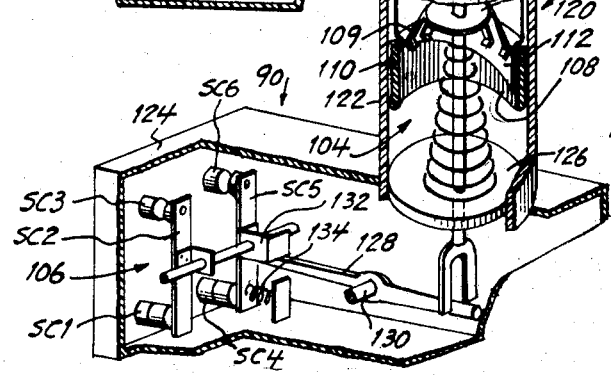
INVENTORS.
RICHARD A. HONKONEN
PAUL E. ALLEN
RICHARD K. WAY
CARL M. LARIME
ATTORNEY

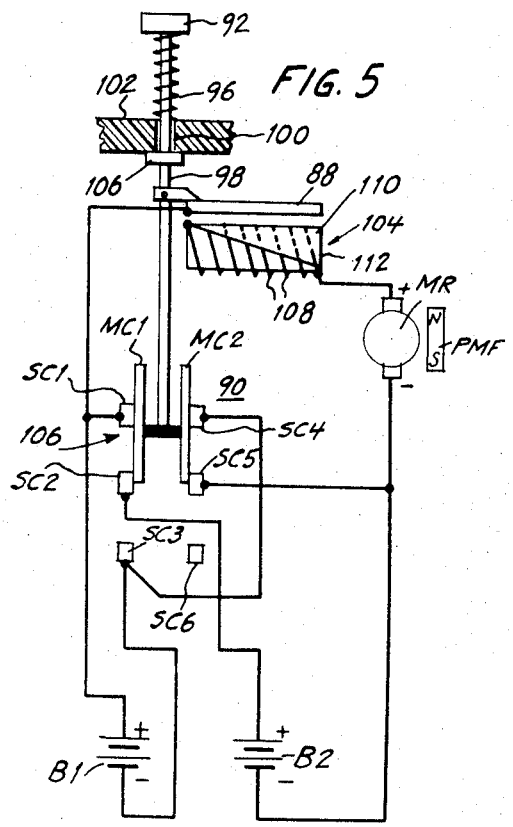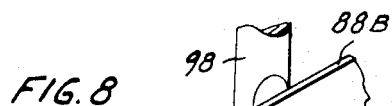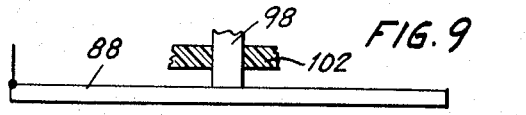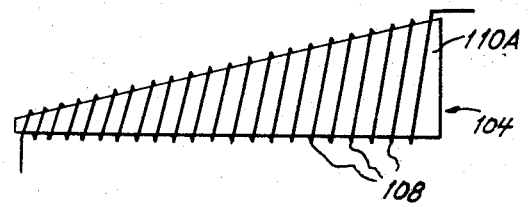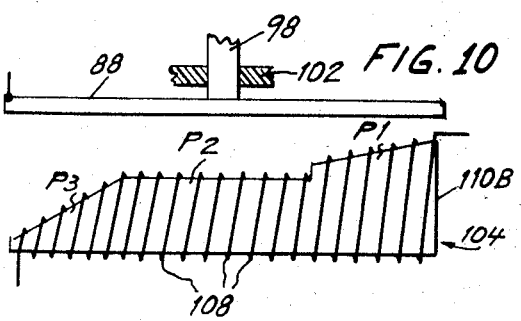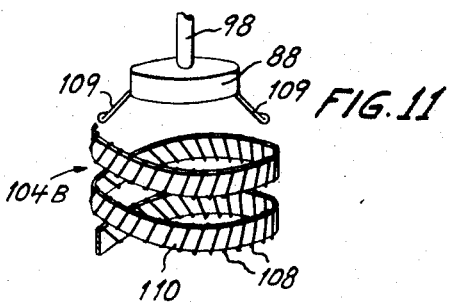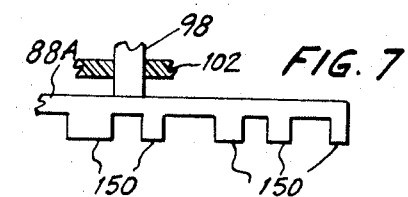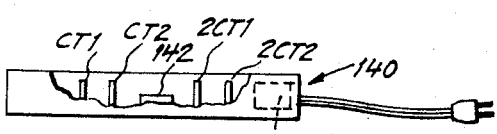

United States Patent Office 3,437,282
Patented Apr. 8, 1969

3,437,282
ELECTRICALLY DRIVEN FISHING REEL
Richard A. Honkonen, Monroe, Paul E. Allen, Newtown, Richard K. Way, Monroe, and Carl M. Larime, Fairfield, Conn., assignors to Sperry Rand Corporation, New York, N.Y., a corporation of Delaware
Filed Sept. 14, 1964, Ser. No. 396,211
Int. Cl. A01k 89/00
U.S. Cl. 242—84.21                     10 Claims

ABSTRACT OF THE DISCLOSURE

A motorized fishing reel having a power supply means including at least two batteries for energizing the motor wherein control means are provided to selectively vary the speed of said motor which include switch means selectively actuatable to electrically interconnect the batteries in parallel or in series with each other.

---

This invention relates to power and control mechanism for electrical appliances, and especially to such mechanism for a motorized fishing reel of relatively small size, weight and capacity adapted for low voltage excitation from a self-contained replenishable direct power source forming part thereof.

It is an object of this invention to provide an improved electrical, portable appliance such as a motorized fishing reel having a replenishable power supply forming part of the appliance, and a separate mechanism for supplying replenishing power to such power supply.

It is another object to provide for such a portable electrical appliance improved power and control mechanism.

It is a further object to provide a novel, compact control of the energization of the appliance, which control is operable by a simple linear motion through a relatively short stroke.

It is yet another feature to provide for such a portable appliance, having a driving motor and at least two rechargeable batteries, an improved device for controlling the energization of the driving motor by the batteries, which control device includes an actuating member operable through a relatively short stroke along a linear path to provide controlled energization of the driving motor with the batteries connected in parallel, one to the other, and reconnection of the batteries in series, one to the other, for a second energization of the motor.

Still another feature is to provide, in the aforementioned improved control device, mechanism for automatically transferring motor energization between the parallel to series battery interconnection conditions in accordance with bidirectional movement of the actuating member past a center point in its path of travel.

In carrying out the invention, according to the preferred embodiment for a fishing reel, there is provided in a first housing, termed a "power unit," a driving motor; a compound control unit for controlling energization of the motor and motion transmitting mechanism for translating the motive power of the motor into winding operation of the reel.

The spinning reel is mounted on one end of the power unit housing in coupled driven relation with the motor armature. The compound control unit includes a normally open single pole, double throw switch, a variable rheostat and a double pole, double throw switch. The motor armature is connected by an electric wire harness to the control unit and to two pairs of electrical terminals disposed at the other end of the power unit housing for connection to a source of power for the motor.

A second housing or container encases two rechargeable batteries, each one of which is electrically interconnected to a pair of associated electrical terminals disposed at one end of the housing and adapted for mating electrical engagement with an associated pair of the terminals of the power unit. This second container and its batteries may be termed a "battery pack" and is designed to be readily attached to and detached from the power unit; the aforementioned terminal electrical interconnection be automatically effected as the two units are mechanically joined.

The power unit is provided with a mounting bracket for attachment onto a fishing pole in any convenient manner. A manual push button which is normally spring biased to a raised position protrudes from the mounting bracket in position for actuation by the thumb of the user. The push button is actuatable through a predetermined linear stroke length. Its linear motion is transmitted to the compound control unit through a flexible shaft for controlling the energization of the motor by the batteries.

Initial depression of the button completes an energizing circuit for the motor through the resistive impedance of the rheostat component of the control unit to the two batteries connected in parallel, one with the other, by the unactuated condition of the double pole, double throw switch component of the control unit. Further depression of the push button sequentially decreases the amount of rheostat impedance in the energizing circuit until substantially the entire rheostat impedance is removed therefrom. At this point, the downward movement of the push button actuates the aforementioned double pole, double throw switch to a second condition, reconnecting the two batteries in series, one with the other, in the motor energizing circuit, thereby greatly and suddenly increasing the energization applied to the motor. The foregoing sequence of operation is inverted, when the push button is permitted to return to its initial raised position under the influence of its biasing spring.

In this manner the compound control unit effects variations in what may be termed slow speed energization of the motor and a transfer from slow speed to what may be termed high speed energization thereof through a simple linear motion in a relatively short stroke length, while retaining a "feel" of the control being effected. This is partly due to the novel construction of the compound control unit.

Features and advantages of the invention will be seen from the above, from the following description of operation when considered in conjunction with the drawings and from the appended claims.

In the drawings:

FIG. 1 is a simplified schematic, partially exploded view in side elevation of a motorized spinning reel appliance equipped with rechargeable batteries and embodying the invention;

FIG. 2 is a simplified schematic view in side elevation of a stand for receiving the battery container of the appliance for recharging the batteries;

FIG. 3 is a cross sectional view taken along the line 3—3 of FIG. 1;

FIG. 4 is a fragmentary cross sectional view taken along the line 4—4 of FIG. 3 and greatly enlarged;

FIG. 5 is a simplified schematic wiring diagram of the circuitry of the appliance of FIG. 1, including a schematic representation, greatly enlarged, of the electromechanical compound manual control device 90 of FIG. 1 for controlling energization of the appliance motor by its batteries;

FIG. 6 is a simplified schematic fragmentary view in perspective with portions broken away and greatly enlarged of the compound manual control device 90 of FIG. 1;

FIG. 7 is a simplified schematic, fragmentary front elevational view of a portion of a modified embodiment of the electrical contact member 88 of the rheostat 104 of FIG. 5;

FIG. 8 is a simplified schematic, fragmentary view in perspective of another modified embodiment of the rheostat 104 of FIG. 5; and FIGS. 9, 10, and 11 are simplified schematic, fragmentary front elevational views of other modified embodiments of the rheostat 104 of FIG. 5.

Referring to FIGURES 1 through 4, a motorized spinning reel is illustrated schematically as consisting of two major units, namely a spinning reel, generally designated 10, and a power unit, generally designated 12 for electro-mechanically driving the spinning reel in a line rewinding operation. Power unit 12 includes a main container 14 and a battery container 16. The latter is readily attachable and detachable from container 14 in any convenient maner, as for example, by fastener 18 extending through container 16 and threaded into container 14. Main container 14 is provided with a mounting bracket 20 for mounting the power unit 12 onto a fishing pole, generally designated 22, in any convenient manner, as for example, by the use of two spaced, retaining rings 24 threaded on pole 22 and coacting with the tapered ends 26 of mounting bracket 20.

Spinning reel 10 may be of any standard type, and is shown schematically as including a spool 30 mounted for rotation on a shaft 32 and pickup arm mechanism 34 through which shaft 32 extends centrally. Pickup arm mechanism 34 is rotatable with respect to shaft 32, and, as is usual in spinning reels, includes a pickup arm 38 which may be pivoted from a non-operative, retracted position (shown in solid line outline FIG. 1) to an extended operative position (shown in broken line outline) by a spring (not shown). Pickup arm 38 is retained in its non-operative position against the bias of its spring (not shown) by a manually releasable latch, generally designated 40. Spool 30 upon which the fishing line 42 is wrapped is maintained on shaft 32 by a retaining member 44 adjustably threaded onto the end of shaft 32. A spring (not shown) encircles shaft 32 between member 44 and one end of spool 30 and is compressed by the threading of member 44 onto shaft 32 to provide an adjustable resistance or "drag" against rotation of spool 30 and unwinding of line 42.

In order to rewind line 42 on spool 30, as is usual, pickup arm 38 is released by actuation of latch 40, its spring (not shown) moving the arm to its extended operating position (in broken line outline). Pickup arm 38 is next rotated with respect to shaft 32, while spool 30 and shaft 32 are reciprocated linearly along the axis of shaft 32. The relative speeds of movement of spool 30 (linearly) and pickup arm 38 (rotative) is predetermined such that pickup arm 38 in rotating functions to lay line 42 loop after loop onto the periphery of spool 30 from one end of the spool to the other to perform what may be termed a "level winding" of line 42. That is with properly selected relative speeds the linear motion of spool 30 while the rotating pickup arm 38 lays line 42 onto the spool prevents line 42 from becoming "bunched up" on one portion of spool 30.

When line 42 is to be unwound or "cast," pickup arm 38 is manually pushed into retracted position (solid line outline) into engagement with latch 40 which retains it thereat.

The aforementioned reciprocating and rotary movements of the spinning reel components during rewinding of line 42 are powered by power unit 12 onto which spinning reel 10 is mounted. The motive force required is provided by a direct current motor, generally designated 50, mounted within casing 14 of power unit 12. Motor 50 includes a rotatable armature (not shown) mounted within a ring type permanent magnet stator (not shown); the outer end of armature shaft 52 being provided with a pinion gear 54. Centrally mounted in one end of casing 14 is a hollow shaft 56, one end of which is frictionally engaged in the inner race of an end bearing 58 mounted in container 14. A portion 60 of hollow shaft 56 protrudes out of casing 14. Hollow shaft 56 is, thus, free to rotate with respect to casing 14. Mounted on hollow shaft 56 is a driven gear 62 which is constantly meshed with pinion gear 54 of motor 50 to impart rotational movement to hollow shaft 56 from motor 50 at a greatly reduced speed. Also formed on hollow shaft 56 are ratchet teeth 64 adapted for cooperation with a ratchet pawl 66 which is normally biased into engagement with teeth 64 by a spring (not shown). A release lever 68 is attached at one end to pawl 66, extends out of casing 14 and is pivotally mounted for manual actuation clockwise (FIG. 3) to move pawl 66 out of engagement with ratchet teeth 64. When in its normal position, pawl 66 and ratchet teeth 64 prevent rotation of hollow shaft 56 in a direction opposite to that in which it is driven by motor 50, while permitting rotation of shaft 56 by motor 50 during rewinding of line 42. Fishing reel 10 is mounted onto power unit 12 driving assembly by inserting one end of shaft 32 inside of hollow shaft 56 for reciprocation in an axial direction with respect thereto. Shaft 32 is maintained against rotation and is guided, while being reciprocated, by a pin 70 extending from the inner end of the shaft into an elongated, axially extending guide slot 72 formed in framework 74 of casing 14. The protruding end 60 of hollow shaft 56 has flats (not shown) defined therein and mates with a companion opening formed in the bottom of pickup arm mechanism 34 thereby attaching mechanism 34 to hollow shaft 56 for rotational movement therewith. A retaining nut 76 threaded onto shaft end 60 secures mechanism 34 to the shaft.

The reciprocatory axial movement of inner shaft 32 and, in turn, spool 30 with respect to hollow shaft 56 is imparted to shaft 32 by means of a double threaded, cam 80 (FIG. 4), defined in the periphery of inner shaft 32 where it extends through the hub of driven gear 62 and hollow shaft 56, cooperating with a pawl or cam follower 82 slidably mounted on gear 62. Pawl 82 protrudes radially from the interior of the hub of gear 62, extends through a radial channel formed in hollow shaft 56, and is maintained by a spring 84 biased into the track of double threaded cam 80. When gear 62 is driven by motor 50 during rewinding, cam follower 82 rides in the track of double threaded cam 80, driving inner shaft 32 axially first in one direction and then in the opposite in accordance with rotational driven movement of gear 62. Double threaded cam 80 is configurated so as to restrict the reciprocatory motion imparted to shaft 32 to linear motion. Thus, the rotational movement of motor 50 is transmitted into rotation of pickup arm mechanism 34 at a reduced speed, while, simultaneously, shaft 32 and, in turn, spool 30 are caused to reciprocate axially at a speed with respect to that of mechanism 34, for example, once for every 10 revolutions of pickup arm mechanism 34. In this manner fishing line 42 is wound onto spool 30 in successive loops by pickup arm 38 in a "level winding" manner, as was previously described.

Motor 50 is energized by two batteries B1 and B2 which are of the rechargeable type. These batteries are encased in battery container 16, and are interconnected electrically by wiring (not shown) each to a pair of recessed female electrical terminals 1BT1, 1BT2 and 2BT1, 2BT2, respectively. When battery container 16 is attached by fastener 18 to container 14 of power unit 12, as was previously described, battery container terminals 1BT1, 1BT2 and 2BT1, 2BT2 are automatically placed into electrical engagement with corresponding male terminals 1MT1, 1MT2 and 2MT1, 2MT2, respectively, protruding from main container 14 to interconnect the batteries to the motor circuit. Preferably, the battery container terminals and their coacting main container terminals are unsymmetrical to insure interconnection of the batteries to the motor circuit at the proper polarity.

In use, it is desirable to control the winding of line 42 onto spool 30 by motor 50. Such control is effected by a speed control device, generally designated 90, mounted in container 14 of the power unit. Speed control device 90 is manually actuatable by means of a push button 92 protruding from mounting bracket 20 of the power unit in position to be depressed by the thumb of the user through a relatively short stroke. Push button 92 is biased by a spring (not shown) to the normally raised position shown in FIG. 1, and is mechanically interconnected to an actuating member (not shown) of device 90 through a flexible shaft 94 threaded through bracket 20.

Speed control device 90 comprises a compound electromechanical circuit component for selectively applying the output of batteries B1, B2, appearing at terminals 1MT1, 1MT2 and 2MT1, 2MT2 to the armature of motor 50, as is shown in the schematic wiring diagram of FIG. 5, wherein the motor armature is generally designated MR, while its permanent magnet field is generally designated PMF. Manual push button 92 and its biasing spring 96 are shown in their normally raised position; the push button for convenience, being shown as actuating control device 90 directly through its elongated stem 98, rather than remotely by means of flexible shaft 94 (FIG. 1). Elongated stem 98 (FIG. 5) extends through a bearing 100 formed in framework 102 of the control device for movement downward against the biasing force of spring 96. A stop 106 formed on stem 98 limits upward movement of the push button and stem by spring 96, while their downward movement is limited by the amount by which spring 96 may be compressed thereby providing downward and upward strokes of equal predetermined lengths.

An electrically conducting contact member 88, which may be termed "shorting bar," is attached to stem 98 for movement therewith but is electrically insulated therefrom. A pair of movable electrical contacts MC1, MC2 are attached to the lower end of stem 98 by means of a cross member 108 of electrical insulating material. These spaced apart contacts are in the form of elongated strips of equal length which slidably coact with six stationary contacts SC1 through SC6 to provide a double pole, double throw switch, generally designated 106. With push button 92 in its normally raised position strip contact MC1 electrically interconnects stationary contacts SC1 and SC2, while strip contact MC2 electrically interconnects stationary contacts SC4 and SC5. The stroke length of push button 92 and the length of movable contacts MC1, MC2 are selected such that, as push button 92 is depressed, strip contacts MC1, MC2 in moving downward maintain the aforementioned stationary contact pairs (SC1, SC2 and SC4, SC5) electrically interconnected, until just before strip contacts MC1, MC2 engage stationary contacts SC3 and SC6, respectively. Switch 106 may, thus, be termed a "break before make" type switch in that movable contacts MC1 and MC2 slide off of then respective stationary contacts SC1, SC4 breaking an initial electrical circuit before engaging their respective stationary contacts SC3, SC6 to make a second circuit.

The positive terminal (+) of motor rotor MR is electrically connected to one end of the coil of a rheostat 104 which, preferably, is of the "card" type, having resistance wire insulatedly wound in successive turns 108 upon a flat, rectangular card 110 of insulating material to form a flat, rectangular rheostat coil. The rheostat wire extending over one flat side of card 110 is stripped of insulation on its exposed surface to present for each turn 108 a portion extending substantially the height of card 110, which turn portion may be electrically contacted.

Rheostat card 104 is positioned with respect to movable contacting member or shorting bar 88 such that, upon push button 92 being actuated downward, bar 88 moves into sliding electrical contacting engagement with the uninsulated portions of rheostat turns 108 during its entire downward stroke and during its upward restoring stroke. However, a mask 112 of electric insulating material of a predetermined configuration (in the preferred embodiment being a flat sheet of inverted right triangular shape) is interposed between wiping contacting member 88 and the uninsulated exposed portions of turns 108 of the rheostat. Mask 112 is configurated to selectively prevent electrical contact between member 88 and turns 108 in a predetermined manner in accordance with the position of member 88 during its downward and upward strokes.

The positive (+) and negative (−) terminals of batteries B1 and M2 for energizing motor rotor MR are interconnected by wiring, as shown, to the other terminal (−) of motor rotor MR, to stationary contacts SC1 through SC6 of the double pole, double throw switch 106 of control device 90, and to contacting member 88 of rheostat 104.

With push button 92 in its undepressed position, as shown, contacting member 88 maintains the enerigizing circuit from batteries B1, B2 to rotor MR interrupted; batteries B1, B2 being connected in parallel with each other through switch 106. Initial depression of push button 92 moves contacting member 88 downward into sliding engagement with the exposed (unmasked) portion of the turn 108 at the extreme left end of the coil of rheostat 104, completing an energizing circuit for motor rotor MR through the entire coil of the rheostat; the circuit extending from the positive terminals (+) of batteries B1 and B2, (presently connected in parallel by movable contact strip MC1 in engagement with stationary contacts SC1, SC2 of switch 106) through all the turns 108 of rheostat 104, and motor rotor MR to the negative terminals (−) of the batteries, which terminals are presently interconnected through stationary contast SC4, SC5 and movable contact MC2 of switch 106. This energizes rotor MR through the full resistive impedance of rheostat 104 for slow speed winding of reel 10 (FIG. 1). This is so, since contact member 88 (FIG. 5) is prevented from electrically contacting the rheostat turns 108 to the right of the first turn 108 by the interposed insulating mask 112.

As contacting member 88 continues moving downward substantially transverse to the longitudinal axis of the rheostat coil, an increasing portion of member 88 slides off insulating mask 112 into electrical contact with successive rheostat turns 108, sequentially from the left to the right of the rheostat coil. Member 88, thus acts as a "shorting bar," since it shunts additional rheostat turns 108 successively in moving downward, effectively "short circuiting" increasing portions of rheostat 104 in the motor circuit. This action shortens the effective electrical path length through the turns 108 of rheostat 104 in the motor energizing circuit, reducing the resistive impedance therein, sequentially increasing the excitation applied to motor rotor MR by the batteries with a resulting increase in the winding speed of reel 10 (FIG. 1).

As push button 92 approaches the bottom of its downward stroke, member 88 (FIG. 5) slides completely off mask 112 into electrical contact with all the turns 108 of rheostat 104, completely, shunting the resistive impedance of the rheostat from the motor circuit, thereby causing maximum slow speed excitation of motor rotor MR. In moving to such bottom position, push button 92, as was previously explained, moves sliding strip contacts MC1, MC2 of switch 106 off their respective stationary contacts SC1, SC4 and into engagement with their respective stationary contacts SC3, SC6, thereby disconnecting batteries B1, B2 from in parallel with each other and reconnecting them in series, one to the other. This approximately doubles the magnitude of the voltage applied across motor rotor MR by the batteries, thereby rapidly and substantially increasing the excitation of the motor rotor, and, in turn, the winding speed of the reel to what may be termed "fast speed" winding. In this manner, as push button 92 is actuated downward, first winding operation of reel 10 is initiated, the winding speed is then increased from a minimum to a maximum in a "slow speed" range, and next is quickly "jumped" to a maximum speed.

It may be noted that adjacent turns 108 of rheostat 104 are shown spaced a relatively great distance apart merely as an aid to the explanation of the operation of control device 90. In actual practice it is preferred to wind each turn 108 tightly against its adjacent turns to provide a compact coil.

It may be seen that, as push button 92 is allowed to restore upward under the influence of its biasing spring, switch 106 of control device 90 interrupts the series interconnection of batteries B1, B2 and reconnects them in parallel, transferring the motor energization from fast speed back to slow speed.

Continued upward movement of push button 92 causes an increasing portion of shorting bar 88 to slide out of electrical contact with successive turns 108 of the rheostat coil, sequentially from the right to the left of the coil, and onto mask 112. This action sequentially increases the amount of resistive impedance inserted in the motor energizing circuit by the rheostat by effectively increasing the electrical path length through the coil turns 108 of the rheostat, causing the fishing reel to wind at an increasingly slow speed.

As push button 92 restores completely, shorting bar 88 moves completely out of electrical contact with rheostat turns 108, interrupting the motor energizing circuit to stop winding of line 42 (FIG. 1) by reel 10.

It may be noted that push button 92 may be depressed only partially, held in any depressed position, and from any such position be allowed to restore either partially or fully, depending upon the winding speed desired by the user. This provides easy control of the winding operating of the motorized, battery operated, spinning reel by means of simple, linear motion through a relatively short stroke length. Such motion may be effected, for example, simply by the flexing of the users thumb on the same hand which grasps the fishing pole. The subject control device 90 permits a simple flexing of the thumb to initiate energization of the motor, control slow speed excitation thereof, and transfer of the battery interconnections from parallel to series, as desired by the user, while retaining what may be termed a "feel" of the control being effected.

In the preferred embodiment electro-mechanical control device 90 is constructed as is illustrated schematically in FIG. 6, wherein the same numeral and/or letter designations are applied to the components as in the circuit of FIG. 5. The control device is encased in a housing 120 comprising a cylinder 122 mounted atop a rectangular box like structure 124. The rheostat component 104 of control device 90 is confined in cylinder 122, while the double pole, double throw switch 106 of the device is mounted in box 124. For convenience, the electric circuit interconnections to rheostat 104 and switch 106 have been omitted, it being understood that they may be interconnected in the circuit of FIG. 5 in any convenient manner. Also for simplicity, push button 92 and its stem 98 have been shown as being directly connected to contact member 88 of rheostat 104.

The rheostat coil with triangular mask 112 is bent into a cylindrical shape, open at both ends, with the longitudinal axis of the coil substantially forming a circle. The cylindrically shaped rheostat 104 is mounted adjacent the inner surface of cylinder 122, with the uninsulated portions of turns 108 of rheostat 104 facing the interior of the cylinder. Stem 98 of push button 92 extends through the top end wall 102 of cylinder 122 along the axis of the cylinder. Contacting member 88 is in the form of a circular disk attached to push button stem 98 which protrudes through the center of the disc. Extending radially from the disc 88 are a plurality of bent over, spaced contact fingers 109 of resilient material in position to slidably engage the exposed uninsulated portions of rheostat turns 108. Spring 96 encircles the depending extension of stem 98 and is maintained in compression between end wall 126 of cylinder 122 and contacting member 88, thereby maintaining fingers 109 of contacting member 88 out of engagement with rheostat turns 108.

Key stem 98 protrudes through end wall 126, terminating in a fork which straddles one end of a lever 128. The lever is fulcrumed at 130 on frame 124.

Switch 106 includes two movable contact arms SC2 and SC5 which are insulatedly mounted on a support 132 pivotally attached to the side wall of housing 124. Movable contact arms SC2, SC5 are positioned for coaction with their associated stationary contacts SC1, SC3 and SC4, SC6, respectively. A biasing spring 134 urges movable contact arms SC2, SC5 into electrical engagement with their respective stationary contacts SC1, SC4.

Manual depression of push button 92, as was previously described for the circuit of FIG. 5, moves contacting member 88 (FIG. 6) into engagement with the exposed, uninsulated turn 108 at one end of the coil of rheostat 104 to initially energize the spinning reel motor through the full resistive impedance of the rheostat, then selectively shunts increasing portions of rheostat 104 to increase the motor energization and in its final movement completely shunts the rheostat from the motor energizing circuit, while its forked end actuates lever 128 clockwise, causing counterclockwise rotation of movable contact arms SC2, SC5 of switch 106 against the bias of spring 134 to reconnect batteries (B1, B2 FIG. 5) from parallel to series through the switch contacts for fast speed energization of the motor.

Upward movement of push button 92 reverses the aforementioned sequence of operation of control device 90, as was previously described in relation to the circuit of FIG. 5.

It may be noted, that, although in the foregoing description of operation batteries B1 and B2 are reconnected from parallel to series or vice-versa when push button 92 is in its substantially fully depressed position, this transfer of the battery interconnection may be made to occur at other points in the control stroke of push button 92, if desired. For example, the position of lever 128 (FIG. 6) with respect to the forked end of stem 98 of the push button may be such that switch 106 is actuated to transfer the batteries from parallel to series interconnection, during the downward stroke of push button 92, at substantially midpoint of such stroke. Such a construction provides a controllable slow speed energization of the motor, and a transfer to a controllable high speed energization of the motor, since with the batteries transferred to series interconnection a portion of rheostat 104 remains in the motor circuit to control high speed energization.

Assume that batteries B1 and B2 (FIG. 1) require recharging. In such a case, fastener 18 is unscrewed and battery container 16 detached from container 14 of power unit 12 permitting replacement with a spare battery container 16 equipped with fully charged batteries. This enables continued operation of the motorized fishing reel.

Next assume that it is desired to recharge the batteries in the first container 16. In such a case, battery container 16 is placed onto charging stand 140 (FIG. 2). Charging stand 140 is configured to receive battery container 16 such that battery terminals 1BT1, 1BT2 and 2BT1, 2BT2 automatically electrically interconnect to charging terminals CT1, CT2 and 2CT1, 2CT2, respectively providing the charging stand. A pressure switch 142 provided on the charging stand is depressed by the weight of battery container 16, completing interconnection of the output of a charging circuit 144 of the charging stand to charging terminals CT1, CT2 and 2CT1, 2CT2. The input of charging circuit 144 of charging stand 140 may be connected to any standard A.C. power outlet to provide input power to the charging apparatus for recharging batteries B1 and B2.

It is to be understood that masking member 112 of FIGS. 5 and 6 need not be in the form of a right triangle, but may be of other shapes, depending upon the control desired. For example mask 112 may be shaped to provide step-like changes in the resistive impedance effective in the energizing circuit.

It is also to be understood that rheostat 104 need not be wound as a coil but may be wound in successive loops of wire in a predetermined direction such that a certain electrical path length is provided through such loops to be transversed by electric current.

It is to be further understood that the subject may be used to provide a variable inductance instead of a rheostat.

It may also be understood that the rheostat coil may be wound with several resistance wires interconnected end to end and each having a different ohmic impedance per unit length to provide a predetermined change in the effective rheostat impedance as contacting member 88 is actuated.

FIGURES 7 through 11 illustrate schematically modified embodiments of rheostat 104 of FIGS. 5 and 6. In FIG. 7 a portion of a modified contacting member or shorting bar 88A of the rheostat is shown as comprising a plurality of contacting fingers 150 of varying widths and spaced apart various amounts. With rheostat 104 (FIG. 5) equipped with modified contacting member 88A, the resistive impedance of the rheostat effective in the circuit upon actuation of push button 92 is in accordance with the predetermined width and spacing of teeth 150 (FIG. 7) of contacting member 88A. It is to be understood that modified contacting member 88A may be disc shaped with radially extending fingers of varying widths spaced unequally for use with a cylindrical rheostat coil similar to that of FIG. 6.

In the modified rheostat embodiment of FIG. 8, instead of utilizing the insulating mask 112 of FIG. 5 to vary the effective electrical path length through coil turns 108 there is provided a contacting member 88B, having flexible contact fingers 154 of resilient material and in position to be flexed into sliding contact with the uninsulated portions of rheostat coil turns 108, as member 88B is actuated downward. A cam 156 is mounted spaced from and parallel to end 110 of the rheostat and is shaped to sequentially cam fingers 154 into a sliding contact with coil turns 108 as the fingers are moved downward between cam 156 and coil turns 108. Conversely, upward movement of member 88B allows resilient fingers 154 to return sequentially to their unflexed or "out of contact" position. As shown in FIG. 8, the first finger 154 at the left is shown flexed by cam 156 into sliding engagement with coil turns 108, while fingers 154 to its right have not yet been cammed into contacting position. Further downward movement of contacting member 88B causes cam 156 to flex the second finger 154 into sliding engagement with turns 108 to vary the electrical circuit path through the rheostat.

In FIG. 9 is illustrated another embodiment which does not use either the insulating mask 112 of FIG. 5 or the camming arrangement of FIG. 8 to vary the effective electrical path length through a coil in accordance with downward and upward movements of a contacting member 88 in a direction transverse to longitudinal axis of the coil. The coil is wound upon a card 110A having a substantially right triangular configuration such that, as contacting member 88 is moved downward, it engages the uninsulated portions of turns 108 of the rheostat 104 sequentially from right to left. For example, as member 88 moves downward, it first contacts the turn 108 furthest to the right of rheostat 104. As member 88 continues downward alongside the card 110A as it was previously described, it contacts additional turns 108 from the right to left of rheostat 104 shunting increasing portions of the coil, thus, sequentially decreasing the effective electrical path length through the coil of rheostat 104.

The process is reversed, increasing such path length through the coil, as member 88 is moved upward to its initial open circuit condition.

FIG. 10 illustrates a card type rheostat 104 of somewhat similar configuration to that of FIG. 9 but having a coil wound on a card 110B that is shaped differently to provide a different control of the rheostat impedance. Card 110B is shaped to provide a certain rate of change in card height in a first portion P1 of the coil, the height is then stepped to a constant height in an intermediate portion P2, and, thereat another rate of change is varied in a third portion P3. With this construction, as the contact member 88 moves downward it sequentially engages turns 108 at a first certain rate throughout portion P1, moves a short distance down the step with no change, then suddenly shorts the store midportion P2 of the rheostat 104. Member 88 next shorts turns 108 in position P3 at a second rate. In this manner the effective electrical path length through the coil of rheostat 104 is controlled in accordance with the shape of card 110B as contact member 88 is moved transversely of the longitudinal axis of the coil.

Lastly, in the embodiment of FIG. 11 a substantially rectangular card type rheostat 104B is curved into helical configuration at a predetermined pitch for mounting within the cylindrical container 122 of FIG. 6 without an insulating mask 112. Contact member 88 in such arrangement is of the disc type and is moved downward causing its resilient fingers 109 to sequentially engage the exposed portions of rheostat turns 108 in accordance with the pitch at which the rheostat is mounted in cylinder 122 to decrease the effective electrical path length through the coil. This configuration does not require either the insulation mask 112 of FIG. 5 or the cam 156 of the embodiment of FIG. 8. With this embodiment, the effective circuit path length through the rheostat coil (for a given wire size and winding density) is much larger than may be obtained with the circular configuration of the rheostat 104 shown in FIG. 6.

It may be noted that the rate of change of the effective electrical circuit path length or impedance of the rheostat may be varied not only by changing the pitch of the helical but also by "tipping" contacting member 88, i.e. by mounting contact member 88 at an angle with the horizontal, or at a certain angle with respect to the longitudinal axis of the rheostat coil.

As changes can be made in the above described construction and many apparently different embodiments of this invention can be made without departing from the scope thereof, it is intended that all matter contained in the above description as shown on the accompanying drawings be interpreted as illustrative only and not in a limiting sense.

What is claimed is:

1. In a motorized spinning reel of the type having a spool and a pick-up arm mechanism for laying a fishing line onto the spool while the spool reciprocates along the spool axis, a casing, a motor mounted in said casing, a drive mechanism housed in said casing and operably connected to said spinning reel, gear means interconnecting said motor to said drive mechanism, said gear means operable upon operation of said motor to cause said drive mechanism to impart said reciprocating movement to said spool while simultaneously causing rotative movement of said pick-up arm relative to said spool about said spool axis for winding said fishing line onto said spool in a level manner, power supply means for supplying power for energization of said motor and including at least two batteries, an energizing circuit from said power supply to said motor, and control means for controlling the energization of said motor from said power supply, said control means including switch means selectively actuatable from a normally open position to a first operative condition wherein said batteries are electrically interconnected in parallel and to a second operative condition wherein said batteries are electrically interconnected in series with each other in said motor energizing circuit to selectively vary the speed of said motor and thereby the laying of the fishing line on said spool.

2. The motorized spinning reel as set forth in claim 1 wherein said motor, gear means and drive mechanism are housed within a first casing, said combination further including said power supply housed in a second casing, means on said first and second casings for detachably securing said casings one to the other, and power input terminals on said first casing and power output terminals on said second casing adapted for mating engagement for preparing said motor energizing circuit upon interconnection of said casings.

3. The motorized spinning reel as set forth in claim 1 wherein a resistance impedance is electrically interconnected in said motor energizing circuit and wherein said switch means is actuatable to a third operative condition to electrically interconnect said resistance impedance in series with said motor under conditions where said batteries are electrically interconnected in parallel to further vary the speed of said motor.

4. A motorized spinning reel as set forth in claim 3 wherein said switch means includes a manually operable linearly displaceable actuator member movable through a predetermined stroke in one direction for effecting said conditions of operation, and means associated with said actuator for returning said actuator in an opposite direction to restore said switch means to the open position.

5. A motorized spinning reel as set forth in claim 3 wherein said resistance impedance comprises a rheostat and wherein said switch means include means for selectively varying the amount of ohmic impedance of said rheostat.

6. A motorized spinning reel as set forth in claim 5 wherein said rheostat is of the card type bent into an arcuate shape, and wherein switch means for inserting said rheostat in said motor energizing circuit includes an actuator comprising an electrical contact member movable linearly through a predetermined stroke in one direction for selectively inserting said rheostat in said energizing circuit and varying the ohmic impedance of the said rheostat in said circuit.

7. Motorized spinning reel as set forth in claim 6 wherein said contact member is provided with an extension, and wherein said switch means further includes a double pole, double throw switch which in said first condition of said switch means interconnects said batteries in parallel, one with the other, and when actuated to the second condition interconnects said batteries in series, one with the other in said motor energizing circuit, and wherein said extension of said rheostat contact member is adapted for actuating said double pole, double throw switch from said first condition to said second condition at a certain point in its stroke changing the interconnection of said batteries in said motor energizing circuit from parallel to series connection.

8. In a motorized spinning reel of the type having a spool and a pick-up arm mechanism for laying a fishing line onto the spool while the spool reciprocates along the spool axis, a casing, a motor mounted in said casing, a drive mechanism housed in said casing operably connected to said spinning reel, gear means interconnecting said motor to said drive mechanism, said gear means operable upon operation of said motor to cause said drive mechanism to impart said reciprocating movement to said spool while simultaneously causing rotative movement of said pick-up arm relative to said spool about said spool axis for winding said fishing line on said spool in a level manner, a second casing, power supply means housed in said second casing for supplying power for energization of said motor and including at least two batteries having electrical output terminals, means on said casings for detachably securing said casings one to the other, electrical input terminals provided in said first casing for mating engagement with said battery output terminals for preparing an energizing circuit from said power supply to said motor upon interconnection of said casings, and control means for controlling the energization of said motor from said power supply, said control means including switch means actuatable to a first condition wherein said batteries are electrically interconnected in parallel and to a second condition wherein said batteries are electrically interconnected in series with each other in said motor energizing circuit for selectively varying the speed of said motor and the laying of the fishing line on said spool.

9. Motorized spinning reel as set forth in claim 8 wherein a resistance impedance is electrically interconnected in said motor energizing circuit and wherein said switch means is actuatable to a third condition to electrically interconnect said resistance impedance in series with said motor under conditions where said batteries are electrically interconnected in parallel to further vary the speed of said motor.

10. In a motorized spinning reel including a spool and a pick-up arm mechanism for laying a fishing line onto the spool while said spool reciprocates along the spool axis, drive mechanism for imparting said reciprocating movement to said spool while simultaneously causing rotative movement of said pick-up arm mechanism relative to said spool about said spool axis for winding said fishing line on said spool in a level manner, said mechanism being housed in a drive unit casing, a hollow shaft rotatively mounted in said drive casing and having an end portion protruding therefrom, a second shaft slidably mounted within said hollow shaft for reciprocating movement therein along the axis of said hollow shaft, said second shaft having an end extending beyond said protruding end of said hollow shaft, said pick-up arm mechanism having a shaft receiving portion configured for receiving said protruding hollow shaft end, means securing said pick-up arm mechanism to said shaft end for rotation with said hollow shaft, means mounting said spool onto said end of said second shaft for reciprocation therewith, an electric motor mounted in said drive casing for driving said hollow shaft and said second shaft, gearing means operatively connecting said motor to said hollow shaft for transmitting rotative movement of said motor to said hollow shaft in a certain direction, means connecting said hollow shaft and said second shaft and operable to cause reciprocation of said second shaft through a predetermined bi-directional stroke in response to rotation of said hollow shaft by said motor, a second casing, a power supply unit for supplying power for energizing said motor housed in said second casing, said power supply unit including at least two batteries each having a pair of interconnecting electric terminals, and wherein said drive unit is equipped with corresponding electrical terminals, attaching means on said casings detachably securing said casings one to the other, said electrical terminals in said casings adapted for mating engagement upon attachment of said casings for preparing an energizing circuit from said power supply to said motor, control means in said drive casing for controlling the energization of said motor by said power supply unit, said control means including a manually actuatable rheostat and electric switching means actuatable for inserting said rheostat in said motor energizing circuit, said rheostat being of the card type bent into an arcuate shape, and said switching means for inserting said rheostat including an electric contact member actuatable linearly through a predetermined stroke for inserting said rheostat in said energizing circuit and varying the ohmic impedance of said rheostat in said circuit, said contact member being provided with an extension, said switching means further including a double pole, double throw switch operable in a first condition to interconnect said electric terminals to place said batteries in parallel one with the other and actuatable to a second condition to interconnect said batteries in series one with the other in said motor energizing circuit, said extension of said rheostat contact member adapted for actuating said double pole, double throw switch from said first condition to said second condition at a certain point in its stroke changing the interconnection of said batteries in said motor energizing circuit from parallel to series connection.

References Cited

UNITED STATES PATENTS

| | | | |
|---|---|---|---|
| 2,469,924 | 5/1949 | Kung | 338—198 X |
| 2,541,876 | 2/1951 | Lockwood | 43—21 |
| 2,637,796 | 5/1953 | Pike | 338—198 X |
| 3,144,217 | 8/1964 | Wood | 242—84.21 |
| 3,195,829 | 7/1965 | Balaguer | 242—84.1 |
| 3,195,830 | 7/1965 | Balaguer | 242—84.1 |
| 3,248,819 | 5/1966 | Stealy | 43—21 |

FOREIGN PATENTS

| | | |
|---|---|---|
| 1,299,923 | 6/1962 | France. |
| 8,033 | 6/1961 | Japan. |

BILLY S. TAYLOR, *Primary Examiner.*

U.S. Cl. X.R.

74—22; 200—4, 157; 318—139, 342, 347; 338—143, 172